United States Patent
Rovira et al.

(12)

(10) Patent No.: US 6,522,406 B1
(45) Date of Patent: Feb. 18, 2003

(54) CORRECTING THE SYSTEM POLARIZATION SENSITIVITY OF A METROLOGY TOOL HAVING A ROTATABLE POLARIZER

(75) Inventors: Pablo I. Rovira, San Francisco, CA (US); Richard A. Yarussi, San Francisco, CA (US); James M. Holden, San Jose, CA (US); Roger R. Lowe-Webb, Mountain View, CA (US)

(73) Assignee: Nanometrics Incorporated, Milpitas, CA (US)

( * ) Notice: Subject to any disclaimer, the term of this patent is extended or adjusted under 35 U.S.C. 154(b) by 0 days.

(21) Appl. No.: 09/877,363

(22) Filed: Jun. 7, 2001

Related U.S. Application Data

(63) Continuation of application No. 09/839,615, filed on Apr. 20, 2001.

(51) Int. Cl.[7] .................................................. G01J 4/00
(52) U.S. Cl. ........................ 356/369; 356/364; 250/225
(58) Field of Search .................................. 356/364, 369; 250/225

(56) References Cited

U.S. PATENT DOCUMENTS

| | | | |
|---|---|---|---|
| 4,153,367 A | 5/1979 | Lietar et al. ................. 356/400 |
| 5,184,230 A | * 2/1993 | Watson ......................... 359/30 |
| 5,206,706 A | 4/1993 | Quinn ......................... 356/400 |

* cited by examiner

*Primary Examiner*—Zandra V. Smith
(74) *Attorney, Agent, or Firm*—Silicon Valley Patent Group LLP; Michael J. Halbert

(57) ABSTRACT

The calibration of a metrology tool with a rotatable polarizer separates the angular dependence of the irradiance from the temporal dependence. The angular dependence of the metrology tool is then modeled, e.g. using a Fourier expansion. The Fourier coefficients are parameterized as a function of wavelength. The actual irradiance, e.g., the reference irradiance and/or back reflection irradiance, is then measured for the metrology tool for one angle of the rotatable polarizer. From the measured irradiance and the modeled angular dependence, the total irradiance of the metrology tool can be determined, which is independent of the angle of the rotatable polarizer. The irradiance, e.g., reference and/or back reflection, can then be determined for any desired angle of the rotatable polarizer using the total irradiance and the angular dependence of the metrology tool.

16 Claims, 3 Drawing Sheets

CORRECTING THE SYSTEM POLARIZATION SENSITIVITY OF A METROLOGY TOOL HAVING A ROTATABLE POLARIZER

CROSS REFERENCE TO RELATED APPLICATION

This application is a continuation of U.S. patent application Ser. No. 09/839,615, filed Apr. 20, 2001, entitled "Correcting The System Polarization Sensitivity Of A Metrology Tool Having A Rotatable Polarizer".

FIELD OF THE INVENTION

This present invention relates in general to metrology devices and in particular to correcting the polarization sensitivity of metrology devices.

BACKGROUND

Metrology devices using rotating polarizers typically suffer from polarization sensitivity. Polarization sensitivity is caused by components of the metrology device, e.g., beam splitters and spectrographs, being sensitive to the polarized state of light. As the polarizer changes the polarization state of the beam of light, the polarization sensitive components will affect the beam of light in different ways. Consequently, the polarization sensitivity of the components of the metrology tool can affect the measurement of a sample.

Thus, it is desirable to correct or avoid polarization sensitivity in a metrology tool. A common technique to avoid polarization sensitivity, often used in ellipsometers, is the use of a polarization scrambler or depolarizing prism in front of the polarization sensitive components. Unfortunately, the polarization scrambler and depolarizing prism significantly reduce the amount of light approaching the detector. Further, polarization scramblers are bulky adding extra complications if the system is to be compact.

Accordingly, a procedure is needed to correct the polarization sensitivity in metrology tools to avoid the use of additional bulky components that reduce the amount of light received by the detector.

SUMMARY

In accordance with an embodiment of the present invention, a method of correcting the polarization sensitivity of a metrology tool, such as a normal incidence polarized reflectance spectrometer or an ellipsometer, includes separating the angular dependence of the irradiance, e.g., the reference irradiance and/or back reflection irradiance, from the temporal dependence. The angular dependence of the metrology tool is modeled, e.g., using a Fourier expansion or any other appropriate manner. If a Fourier expansion is used, the Fourier coefficients are parameterized as a function of wavelength. The actual polarization dependent irradiance, e.g., the reference irradiance and/or back reflection irradiance, is then measured for the metrology tool for one angle of the rotatable polarizer. From the measured irradiance and the modeled angular dependence, the total irradiance of the metrology tool can be determined. The total irradiance is independent of the angle of the rotatable polarizer. With the total irradiance known, the polarization dependent irradiance, e.g., reference and/or back reflection irradiance, can then be determined for any desired angle of the rotatable polarizer using the total irradiance and the angular dependence of the metrology tool.

DETAILED DESCRIPTION

In accordance with an embodiment of the present invention, a method is used to correct the polarization sensitivity of a metrology tool, such as a normal incidence polarized reflectance spectrometer or an ellipsometer. The procedure corrects for the polarization sensitivity of the system by separating the angular dependence from the temporal dependence of the system. Accordingly, the irradiance of the metrology tool can be determined for any angle of the rotatable polarizer by measuring the irradiance at only one angle of the polarizer. Thus, through the procedure in accordance with an embodiment of the present invention, bulky components, such as polarization scramblers and depolarizing prisms can be eliminated and there is no need to physically measure the irradiance at every polarizer angle.

Figure 1:
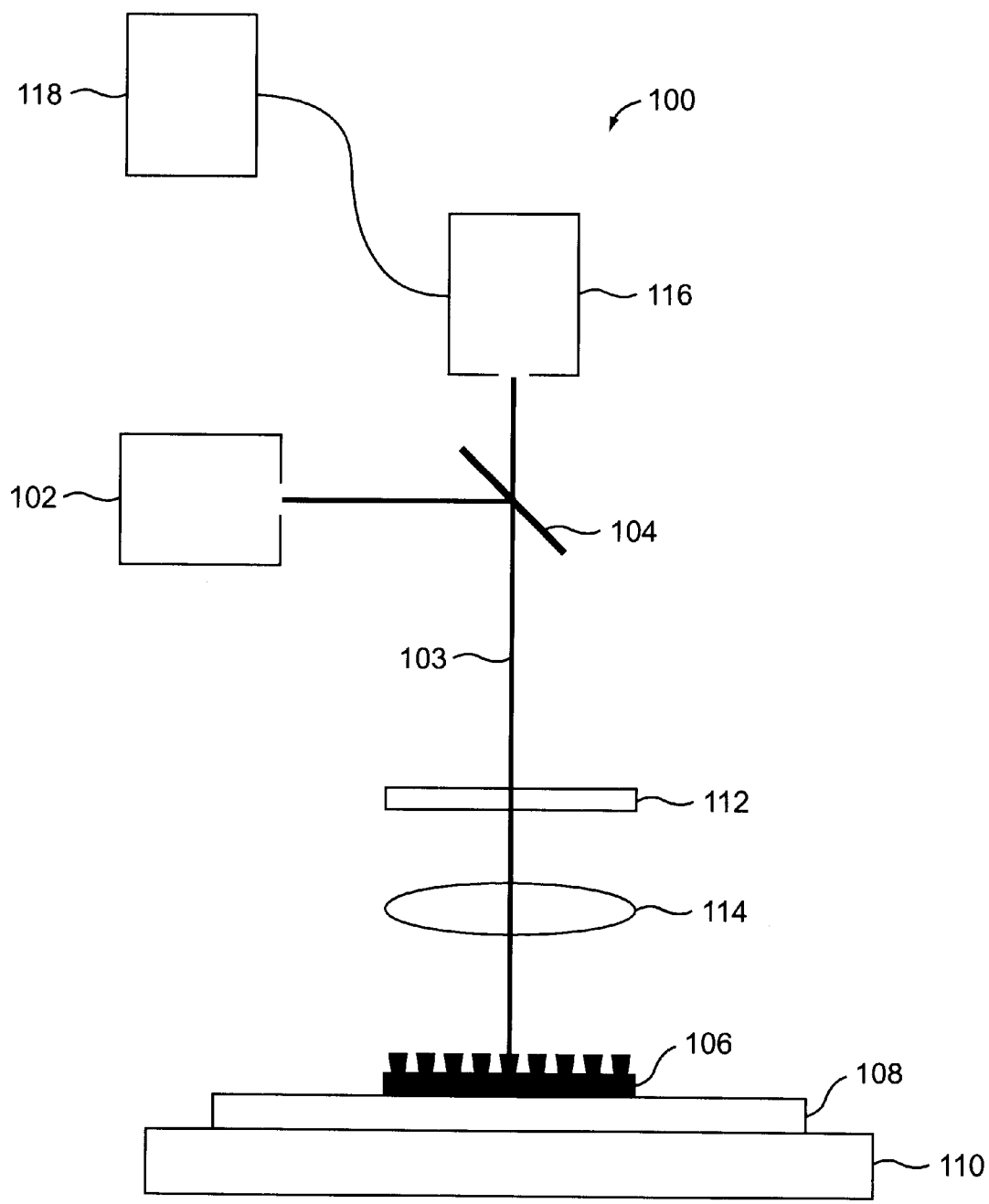
FIG. 1 is a block diagram showing a normal incidence polarized reflectance spectrometer that the present invention may be used to calibrate

FIG. 1 is a block diagram showing a normal incidence polarized reflectance spectrometer 100, that the present invention may be used to calibrate. Spectrometer 100 measures at normal incidence the sample reflectivity when the polarized electric field of the impinging electromagnetic wave is either parallel (TE mode) or perpendicular (TM mode) with the lines of the measured diffraction grating structure. Spectrometer 100 is similar to the device discussed in detail in the U.S. Patent Application entitled "Apparatus and Method for the Measurement of Diffracting Structures," filed Sep. 25, 2000, having Ser. No. 09/670,000, which is incorporated herein by reference.

It should be understood that the present invention may be used with other metrology devices that include a rotatable polarizer and that has polarization sensitive components, such as ellipsometers. Nevertheless, for the sake of simplicity, the present invention will be described with reference to spectrometer 100. Application of the present invention to other metrology devices, such as an ellipsometer, will be clear to one of ordinary skill in the art based on the present disclosure.

As shown in FIG. 1, spectrometer 100 includes a polychromatic light source 102 that generates a light beam that is partially reflected by beam splitter 104 along the optical axis 103. The light beam is directed towards a sample 106 to be measured, which is, e.g., a diffraction grating on a substrate 108. Substrate 108 may be, e.g., a semiconductor wafer or flat panel display or any other substrate, and is supported by a stage 10, which may be a polar coordinate, i.e., R-Θ, stage or an x-y translation stage. Spectrometer 100 includes a rotatable polarizer 112 and a lens 114 (or series of lenses) to polarize and focus the light beam onto the sample 106 at normal incidence. The beam is reflected off sample 106 and the reflected light is transmitted through lens 114 and polarizer 112. A portion of the reflected light is transmitted through beam splitter 104 and is received by a spectrophotometer 116. Spectrophotometer 116 is coupled to processor 118, which analyzes the data provided by spectrophotometer 116. For more information on the general operation of a normal incidence polarized reflectance spectrometer, the reader is referred to Ser. No. 09/670,000, which is incorporated herein by reference.

The polarized reflectance of spectrometer 100 is given by:

$$R(\lambda, P) = \frac{I_{sam}(\lambda, P) - I_{back}(\lambda, P) - 2*I_{dark}(\lambda)}{I_{ref}(\lambda, P) - I_{back}(\lambda, P) - 2*I_{dark}(\lambda)} \cdot R_{ref}(\lambda) \quad (1)$$

where $I_{sam}(\lambda, P)$ is the reflected irradiance spectrum from the sample 106 for a given polarizer angle P, i.e., the angle of the transmission axis of polarizer 112 with respect to a home position, and light wavelength $\lambda$, $I_{back}(\lambda, P)$ is the back reflection irradiance from the optical elements, e.g., beam splitter 104, polarizer 112, and lens 114, collected without sample 106, $I_{ref}(\lambda, P)$ is the reflected irradiance spectrum from a reference sample, which must be isotropic, i.e., its reflectance $R_{ref}(\lambda)$ at normal incidence must be independent of the orientation of the transmission axis of polarizer 112, and $I_{dark}(\lambda)$ is the background and dark current measured together.

While the background and dark current $I_{dark}(\lambda)$ are independent of the polarizer angle P, the reference irradiance $I_{ref}(\lambda)$ and the back reflection irradiance $I_{back}(\lambda, P)$ are dependent on the polarizer angle P. Consequently, as the polarizer 112 rotates, which changes the polarization state of the light beam striking the polarization sensitive components in the metrology device, the values of the reference irradiance $I_{ref}(\lambda, P)$ and the back reflection irradiance $I_{back}(\lambda, P)$ will change. Accordingly, the value of polarized reflectance $R(\lambda, P)$ of spectrometer 100 will change as the polarizer 112 is rotated.

It should be understood, of course, that while other metrology devices, such as ellipsometers, have different reflectance equations than is shown in equation 1, the polarization sensitivity of other metrology devices will affect their desired measurements in a similar manner, as will be understood by those of ordinary skill in the art.

Thus, the system polarization sensitivity must be corrected or avoided. A simple method of correcting the system polarization sensitivity is to measure the reference irradiance $I_{ref}(\lambda, P)$ and the back reflection irradiance $I_{back}(\lambda, P)$ for each angle that is used in the measurement of the sample irradiance $I_{sam}(\lambda, P)$. However, this approach is cumbersome and significantly reduces the measurement speed of the system, and therefore not suitable for automated metrology.

Accordingly, in accordance with an embodiment of the present invention, the metrology device is calibrated to parameterize the polarization dependence of the reference irradiance $I_{ref}(\lambda, P)$ and/or back reflection irradiance $I_{back}(\lambda, P)$. Thus, by measuring the polarization dependent irradiance, e.g., the reference irradiance and/or the back reflection irradiance, at one angle, the polarization dependent irradiance can be determined for any other angle. Consequently, it is not necessary to physically measure the values of polarization dependent irradiance for every polarizer angle.

Figure 2:
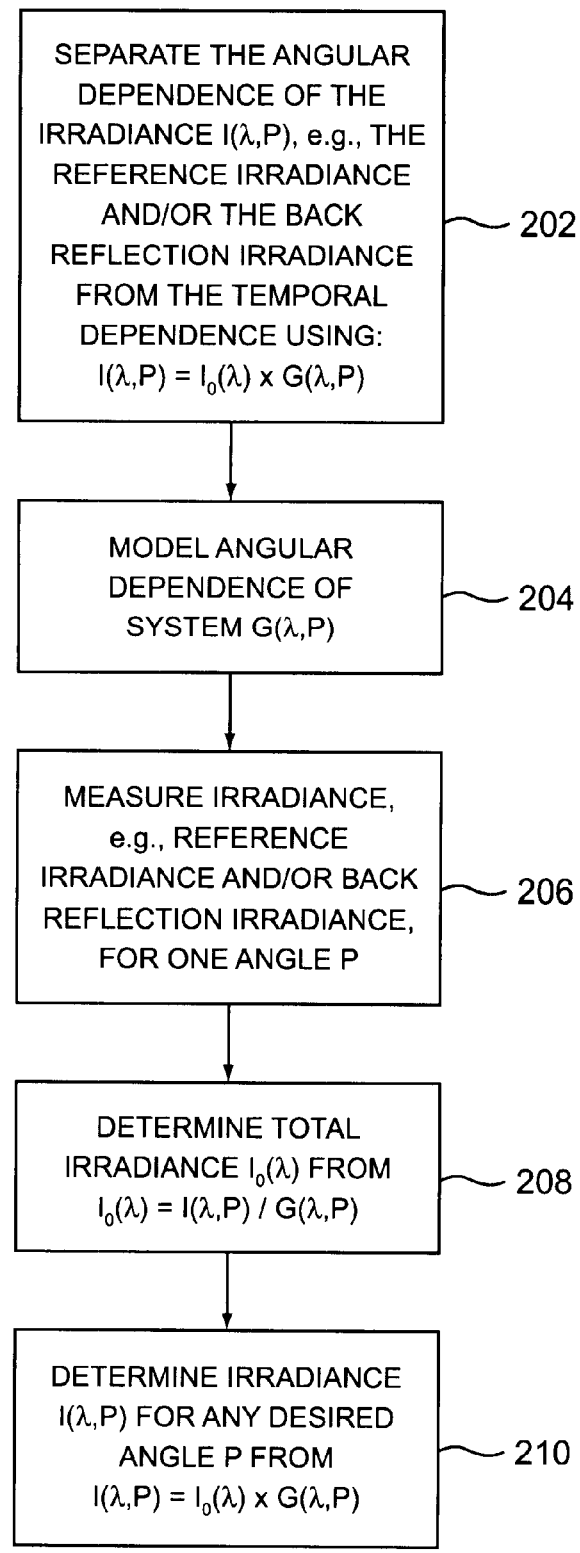
FIG. 2 illustrates the process of calibrating a metrology device, e.g., the normal incidence polarized reflectance spectrometer of FIG. 1 or an ellipsometer, in accordance with an embodiment of the present invention.

FIG. 2 illustrates the process 200 of calibrating a metrology device, e.g., spectrometer 100, in accordance with an embodiment of the present invention. Calibration process 200 separates the angular dependence of $I_{ref}(\lambda, P)$ and/or $I_{back}(\lambda, P)$ from the temporal dependence to parameterize the polarization dependence of the reference irradiance $I_{ref}(\lambda, P)$ and back reflection irradiance $I_{back}(\lambda, P)$ (block 202), so that it is not necessary to measure the polarization dependent irradiance at all angles. The angular dependence may be separated from the temporal dependence, as follows, where the notation, $I_{ref}(\lambda, P)$ is either $I_{ref}(\lambda, P)$ or $I_{back}(\lambda, P)$:

$$I(\lambda, P) = I_0(\lambda) \times G(\lambda, P) \quad (2)$$

where $I_0(\lambda)$ represents the total irradiance, and can be time-dependent due to lamp instabilities, temperature fluctuations, etc., and $G(\lambda, P)$ is the angular dependence of the system and is a normalized function that accounts for the system angular sensitivity, e.g., from the beam splitter, the spectrograph, polarizer imperfections, or light source polarization.

The angular dependence of the system $G(\lambda, P)$ is then modeled (block 204). The angular dependence of the system $G(\lambda, P)$, for example, can be described as a Fourier expansion, which is physically adequate because any rotating polarizer system response is the sum of even harmonics. The angular dependence of the system $G(\lambda, P)$, from equation 2, can be expressed as:

$$G(\lambda, P) = 1 + \alpha_2(\lambda)\cos(2P) + \beta_2(\lambda)\sin(2P) + \alpha_4(\lambda)\cos(4P) + \quad (3)$$
$$\beta_4(\lambda)\sin(4P) + \alpha_8(\lambda)\cos(8P) + \beta_8(\lambda)\sin(8P) + ...$$

where:

$$\alpha_m = \frac{2}{I_{sum}} \sum_j I_j \cdot \cos(m \cdot P_j) \quad (4)$$

$$\beta_m = \frac{2}{I_{sum}} \sum_j I_j \cdot \sin(m \cdot P_j)$$

$$I_{sum} = \sum_j I_j$$

are the normalized Fourier coefficients. If desired, the angular dependence $G(\lambda, P)$ can be described using other mathematical expressions, such Bessel functions.

Figure 3:
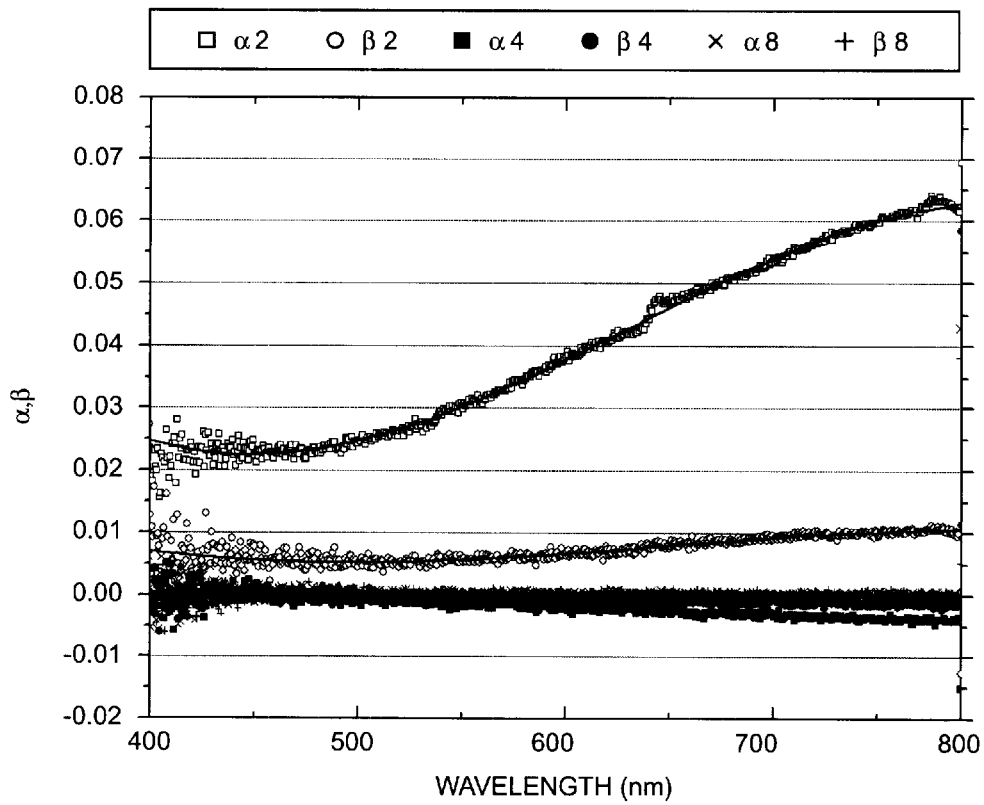
FIG. 3 is a graph showing the Fourier coefficients $\alpha$, $\beta$ as a function of wavelength, representing the angular dependence $G(\lambda, P)$ of a metrology device.

FIG. 3 is a graph showing the Fourier coefficients α, β as a function of wavelength, representing the angular dependence $G(\lambda, P)$ of spectrometer 100. The symbols in FIG. 3 are experimental values obtained from a spectrometer 100, while the lines are the corresponding fits as defined by a third order polynomial. As can be seen in FIG. 3, the $8^{th}$ harmonic of the Fourier series is very close to zero. Consequently, no extra harmonics are necessary. In fact, only taking the $2^{nd}$ and $4^{th}$ harmonics is adequate to reproduce the system response. However, an extra number of harmonics, i.e., the $8^{th}$ harmonics, and possibly some odd harmonics, may be necessary to account for imperfections in polarizer 112.

To reduce error propagation from the referencing scheme to the reflectance spectra, the dependence of the Fourier coefficients α, β are parameterized as a function of wavelength λ. Care must be taken in parameterized the Fourier coefficients, because the Fourier coefficients are not necessarily smooth functions of wavelength λ, particularly, where there are multimode fiber optics or other such components present in the spectrometer 100, e.g., in front of the spectrophotometer 116. Therefore, the functions chosen to parameterize the Fourier coefficients α, β as a function of wavelength λ will depend on the characteristics of the system, e.g., the spectrophotometer 116 and beam splitter 104. A third order polynomial fit has been found adequate to parameterize the Fourier coefficients. The use of a polynomial fit to describe the Fourier coefficients α, β is advantageous because only the polynomial coefficients need be stored, instead of the Fourier coefficients for each wavelength λ. Further, the polynomial fit provides an average to advantageously disregard noise.

Once the Fourier harmonics are obtained and parameterized, so that the angular dependence G(λ, P) of spectrometer 100 is adequately described, the reference irradiance $I_{ref}(\lambda, P)$ and back reflection irradiance $I_{back}(\lambda, P)$ can be measured for one given angle (block 206), and from this the total irradiance $I_0(\lambda)$ for the system, which is independent of angle P, can then be obtained (block 208) using:

$$I_0(\lambda) = \frac{I(\lambda, P)}{G(\lambda, P)} \tag{5}$$

With the total irradiance $I_0(\lambda)$ and the angular dependence G(λ, P) of the system known, the reference irradiance $I_{ref}(\lambda, P)$ and back reflection irradiance $I_{back}(\lambda, P)$ can be calculated for any angle P using equation 2 (block 210). Accordingly, the measurements of sample 106 can be performed at any angle, by using equations 1, 2, and 3. There is no need to actually measure the reference irradiance $I_{ref}(\lambda, P)$ and the back reflection irradiance $I_{back}(\lambda, P)$ for the same angle that is used in the measurement of the sample irradiance $I_{sam}(\lambda, P)$.

Figure 4:
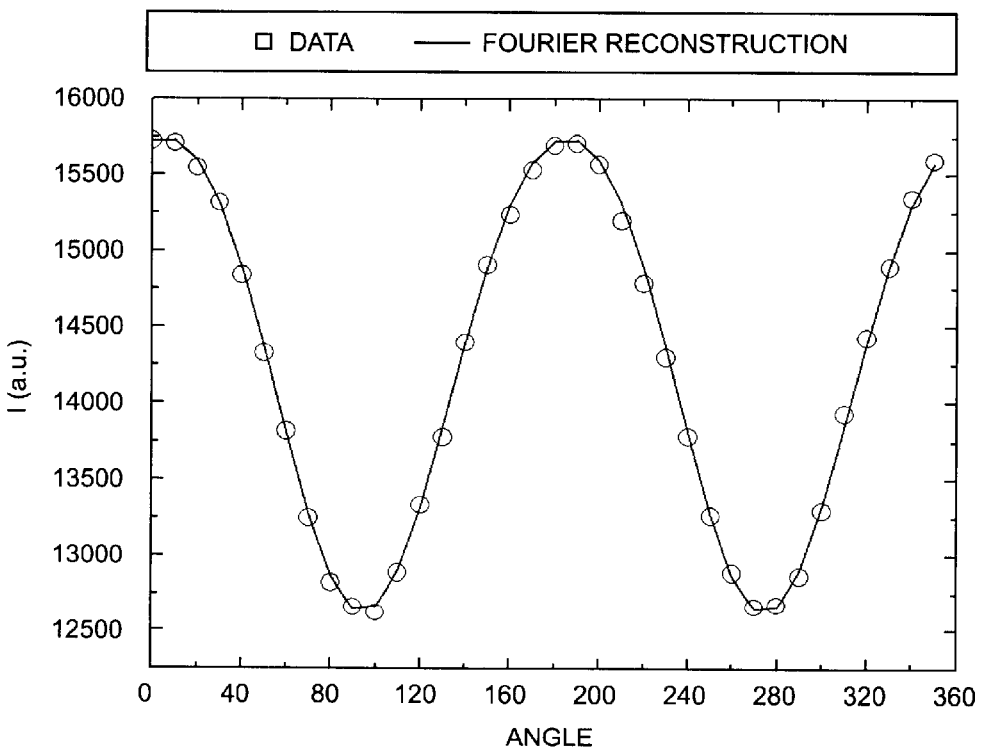
FIG. 4 is a graph showing the irradiance from a sample as measured by a normal incidence polarized reflectance spectrometer collected at different orientations of the polarizer transmission angle P for one wavelength.

FIG. 4 is a graph showing the fit between the measured reference irradiance and the reference irradiance calculated in accordance with the present invention. The irradiance in arbitrary units shown in FIG. 4 is from a sample as measured by spectrometer 100 collected at different orientations of the polarizer transmission angle P for one wavelength. The symbols (dots) in FIG. 4 are measured data points, while the line is the calculated irradiance from the parameterized coefficients shown in FIG. 3.

It should be understood that the foregoing description is only illustrative of the invention. Various alternatives and modifications can be devised by those skilled in the art without departing from the invention. For instance, while the present invention is described in terms of a normal incidence polarized reflectance spectrometer, the present invention may be used to calibrate other metrology devices, such as an ellipsometer, as well. Further, different mathematical expressions of the angular dependence of the system G(λ, P), such as Bessel functions, can be used if desired. Accordingly, the present invention is intended to embrace all such alternatives, modifications and variances that fall within the scope of the appended claims.

What is claimed is:

1. A method of correcting the system polarization sensitivity of a metrology tool having a rotatable polarizer, said method comprising:
   modeling the angular dependence of said metrology tool;
   measuring at least one polarization dependent irradiance for an angle of said rotatable polarizer;
   determining the total irradiance of said metrology tool using the polarization dependent irradiance measured at said angle and the modeled angular dependence of said metrology tool at said angle, said total irradiance being independent of the angle of said rotatable polarizer; and
   determining at least one polarization dependent irradiance for any desired angle of said rotatable polarizer using said total irradiance and said modeled angular dependence of said metrology tool at said desired angle.

2. The method of claim 1, wherein said at least one polarization dependent irradiance is a reference irradiance.

3. The method of claim 1, wherein said at least one polarization dependent irradiance is a back reflection irradiance.

4. The method of claim 1, wherein modeling the angular dependence of said metrology tool comprises using a Fourier expansion.

5. The method of claim 4, wherein said modeled angular dependence is defined as G(λ, P) and is equal to:

$$G(\lambda, P) = 1 + \alpha_2(\lambda)\cos(2P) + \beta_2(\lambda)\sin(2P) + \\ \alpha_4(\lambda)\cos(4P) + \beta_4(\lambda)\sin(4P) + \alpha_8(\lambda)\cos(8P) + \beta_8(\lambda)\sin(8P) + \ldots$$

where P is the angle of the transmission axis of said polarizer with respect to a home position, λ is the light wavelength, and α, β, and I are normalized Fourier coefficients:

$$\alpha_m = \frac{2}{I_{sum}} \sum_j I_j \cdot \cos(m \cdot P_j)$$

$$\beta_m = \frac{2}{I_{sum}} \sum_j I_j \cdot \sin(m \cdot P_j)$$

$$I_{sum} = \sum_j I_j.$$

6. The method of claim 4, wherein said Fourier expansion includes Fourier coefficients, said modeling the angular dependence of said metrology tool further comprises parameterizing the dependence of said Fourier coefficients as a function of wavelength.

7. The method of claim 6, wherein said Fourier coefficients are parameterized using a polynomial.

8. The method of claim 1, wherein said method is performed for multiple wavelengths.

9. The method of claim 1, wherein said metrology tool is a normal incidence polarized reflectance spectrometer.

10. The method of claim 9, wherein said at least one polarization dependent irradiance is a reference irradiance and a back reflection irradiance, wherein the polarized reflectance for a sample being measured by said normal incidence polarized reflectance spectrometer is given by:

$$R(\lambda, P) = \frac{I_{sam}(\lambda, P) - I_{back}(\lambda, P) - 2*I_{dark}(\lambda)}{I_{ref}(\lambda, P) - I_{back}(\lambda, P) - 2*I_{dark}(\lambda)} \cdot R_{ref}(\lambda)$$

where $I_{sam}(\lambda, P)$ is the reflected irradiance spectrum from said sample for a given polarizer angle P and the light wavelength $\lambda$, $I_{back}(\lambda, P)$ is the back reflection irradiance collected without said sample, $I_{ref}(\lambda, P)$ is the reflected irradiance spectrum from a reference sample, and $I_{dark}(\lambda)$ is the background and dark current measured together.

11. The method of claim 1, wherein determining the total irradiance comprises dividing the polarization dependent irradiance measured at said angle by the modeled angular dependence of said metrology tool at said angle.

12. The method of claim 1, wherein determining at least one polarization dependent irradiance for any desired angle of said rotatable polarizer comprises multiplying said total irradiance by said angular dependence of said metrology tool at said desired angle.

13. A method of correcting the system polarization sensitivity of a normal incidence polarized reflectance spectrometer, said method comprising:

modeling the angular dependence of said system;

measuring the reference irradiance for a first polarization angle;

measuring the back reflection irradiance for a second polarization angle;

determining the total reference irradiance of said system using the reference irradiance measured at said first polarization angle and the modeled angular dependence of said system at said first polarization angle, said total reference irradiance being independent of the polarization angle;

determining the total back reflection irradiance of said system using the back reflection irradiance measured at said second polarization angle and the modeled angular dependence of said system at said second polarization angle, said total back reflection irradiance being independent of the polarization angle;

determining the reference irradiance for any desired polarization angle using said total reference irradiance and said modeled angular dependence of said system at said desired polarization angle; and determining the back reflection irradiance for any desired polarization angle using said total back reflection irradiance and said modeled angular dependence of said system at said desired polarization angle.

14. The method of claim 13, wherein said first polarization angle is the same as said second polarization angle.

15. The method of claim 13, wherein determining the total reference irradiance comprises dividing the reference irradiance measured at said first polarization angle by the modeled angular dependence of said system at said first polarization angle and determining the total back reflection irradiance comprises dividing the back reflection irradiance measured at said second polarization angle by the modeled angular dependence of said system at said second polarization angle.

16. The method of claim 13, wherein determining the reference irradiance for any desired polarization angle comprises multiplying said total reference irradiance and said modeled angular dependence of said system at said desired polarization angle and determining the back reflection irradiance for any desired polarization angle comprises multiplying said total back reflection irradiance and said modeled angular dependence of said system at said desired polarization angle.

* * * * *